Patented Apr. 28, 1942

2,280,918

UNITED STATES PATENT OFFICE 2,280,918

PREPARATION OF ORTHO-HYDROXY-CINNAMIC ACID

Jonas Kamlet, Brooklyn, N. Y., assignor to Miles Laboratories, Inc., Elkhart, Ind., a corporation of Indiana No Drawing. Application October 25, 1940,
Serial No. 362,839

15 Claims. (Cl. 260—521)

The present invention relates to the preparation of ortho-hydroxycinnamic acid and, more particularly, to a process for the manufacture of ortho-hydroxycinnamic acid in good yields from cheap and readily available raw materials and without the use of expensive equipment and high temperatures.

Ortho-hydroxycinnamic acid is valuable as an intermediate in the manufacture of coumarin, which is extensively used as a flavoring material. Thus, Fittig (Annalen, 226, 352) describes the quantitative conversion of o-hydroxycinnamic acid to coumarin. O-hydroxycinnamic acid is dissolved in a cold, saturated hydrobromic acid solution, allowed to stand at room temperature for twenty-four hours, then diluted with water to precipitate the coumarin. German Patent 440,341 of 1924 describes the conversion of o-hydroxycinnamic acid to coumarin in 75% yield by reaction with small amounts of a mercury salt, while Seshadri and Suryaprakasa-Rao (Proc. Indian Acad. Sciences, 4A, 157, 1936) obtain 100% conversion by boiling an aqueous solution of o-hydroxycinnamic acid with mercuric chloride and hydrochloric acid for two hours, then allowing the solution to cool. Stoermer (Berichte, 42, 4867) also obtains coumarin in 75% yield by irradiating a benzene or methanol solution of o-hydroxycinnamic acid with ultraviolet light for a number of days.

The oldest coumarin synthesis, and the one which is still used most widely, is that of Perkins (Annalen 147, 230; 148, 206; Journ. Chem. Soc. London, (2), 6, 54, 1868) based on the reaction of salicylaldehyde with acetic anhydride and anhydrous sodium acetate. The best yield by this method, according to Gnehm (Berichte, 14, 262) are nine parts of coumarin from twenty parts of salicylaldehyde, although Yanagisawa and Kondo (Journ. Pharm. Soc. Japan, 1921, 498) claim a 70% yield by the use of iodine as a catalyst.

It has also been proposed by Stuart (Journ. Chem. Soc. London, 49, 366, 1886; Berichte, 19R, 350) and Knoevenagel (German Patents 94,132, 97,734, 97,735, 161,171, 164,296; Berichte, 31, 2618) to prepare coumarin by reacting salicylaldehyde with malonic acid to yield coumarin-3-carboxylic acid which decarboxylates on heating. Haarman and Reimer (German Patent 189,252) prepare the coumarin-3-carboxylic acid from salicylaldehyde and cyanacetic acid. The use of salicylaldehyde is avoided altogether by direct synthesis of coumarin from esters of o-hydroxybenzal chloride (German Patent 223,684, U. S. Patents 1,920,494 and 2,062,364).

It is a further purpose of this invention to provide a means whereby a higher over-all yield of coumarin from salicylaldehyde may be obtained than from any modification of the Perkins synthesis heretofore available.

The basis of the present invention is the finding that ortho-hydroxycinnamic acid may be obtained in good yield by reacting an alkaline solution of salicylalacetone with a solution or suspension of a member of the group comprising the alkali metal- and alkali-earth metal-hypohalites, and acidifying the resultant salt of o-hydroxycinnamic acid.

I am aware that it has been proposed (German Patent 21,162; French Patent 149,934; English Patent 3218 of 1881; U. S. Patent 276,883) to convert benzalacetone (or o-nitrobenzalacetone) to cinnamic acid (or o-nitrocinnamic acid) by reaction with an alkali-metal hypohalite. However, due to the phenolic nature of salicylalacetone, all attempts to oxidize the terminal keto-methyl group to a carboxylic group by the use of any oxidizing agents in acid and neutral solution, usually lead to a complex mixture of tars, resins, highly-colored quinonoid derivatives together with little or no o-hydroxycinnamic acid at all. In alkaline solution, the use of any oxidizing agents except the hypohalites is similarly unsuccessful. It was therefore quite surprising to find that alkali-metal and alkali earth-metal hypohalites in alkaline solution will react almost entirely with the terminal carboxymethyl group on the side-chain, leaving the phenolic ring intact. This is an anomalous behavior since phenols (of which group salicylalacetone is a member) will generally react with hypohalite solutions to yield ring substituted chlorphenols and highly colored quinones (Berichte, 16, 1749; 20, 2781; 22, 1238 and 1246; 22, 1264). By the present invention, there is no appreciable reaction of the hypohalite solution with any but the terminal carboxymethyl group of the salicylalacetone.

Salicylalacetone may be obtained in quantitative yield by reacting an alkaline solution of salicylaldehyde with an excess of acetone. (Harries, Berichte, 24, 3180). On reaction with a hypohalite, (such as sodium hypochlorite) it yields a salt of o-hydroxycinnamic acid and a haloform (such as chloroform), thus:

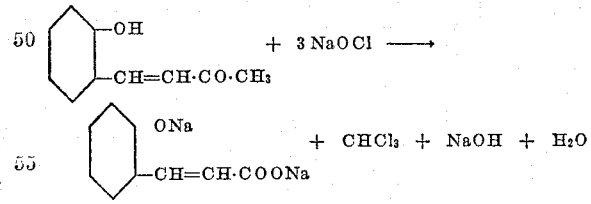

On acidification, the free o-hydroxycinnamic acid is obtained, and may be converted to coumarin without further treatment. The chloroform represents a valuable and important by-product of this process.

All hypohalites are operative in this process and give good yields, but the alkali-metal-hypochlorites give better yields than the others and are cheaper. The reaction is carried out in general by vigorously mixing an alkaline solution of salicylalacetone with a solution or suspension of an alkali-metal or alkali-earth metal hypochlorite, containing preferably between 5% and 20% of available chlorine, and distilling off the chloroform as soon as it forms. The presence of free chloroform in the solution should be avoided because of the well known tendency of phenols in alkaline solution to interact with haloforms to form ring substituents. For a given quantity of salicylalacetone, the theoretical amount of hypohalite, or slightly less than the theoretrical amount, should be employed. An excess of hypohalite in the solution is undesirable because of its tendency to liberate free halogen when the alkaline solution of o-hydroxycinnamic acid salt is acidified to recover the free acid. Few common reducing agents are available for neutralizing any excess of hypohalite, because they tend also to react with the organic material. Oxalic acid, however, may be used, but the avoidance of excess hypohalite is greatly preferred.

Theoretically, o-hydroxycinnamic acid is capable of existing in two isomeric forms trans- and cis-ortho-hydroxycinnamic acid. Cis-o-hydroxycinnamic acid does not exist in the free form but readily undergoes an intramolecular dehydration and condensation to form coumarin. The product obtained by the process herein described is trans-ortho-hydroxycinnamic acid and contains only traces of the cis isomer, coumarin.

The following example of a typical process for carrying out the present invention is intended to define and illustrate but in no way to limit this invention to the reagents, proportion, conditions or apparatus described therein. Obvious modifications will occur to any person skilled in the art.

*Example*

100 grams of technical salicylaldehyde is dissolved in a well-agitated solution of 64 grams of caustic soda in two liters of water, and 120 grams of acetone is added to the resulting clear yellow solution. After standing at room temperature for 48 hours, the deeply red-colored reaction mixture is acidified by adding, with vigorous stirring, 175 cc. of concentrated (22° Bé.) hydrochloric acid. The copious precipitate of salicylalacetone that forms is rapidly filtered off by suction.

The moist filter cake containing 129 grams of salicylalacetone is dissolved in 320 cc. 20% sodium hydroxide solution and 800 cc. of water, and heated to 45° C. To this solution is now added rapidly 1150 cc. of a freshly prepared 15% (14.28% available chlorine) sodium hypochlorite solution, and the mixture is transferred to a distilling flask fitted with a stirrer.

The well agitated reaction mixture is now heated. At 60°–70° C., the chloroform distills over and is collected and recovered. When the temperature reaches 90° C., 500 cc. of concentrated (22° Bé.) hydrochloric acid is added, and the hot solution is rapidly filtered from a small amount of unreacted salicylalacetone that separates out, and a possible small amount of coumarin which may also separate out. At this point, the reaction mixture should give a negative test with potassium iodide-starch paper. The production of color in the paper indicates that excess hypohalite has been used inadvertently, and this will explain any contamination of the product by colored impurities.

On cooling, a copious precipitate of o-hydroxycinnamic acid settles out, is filtered off and washed with water. The product thus obtained can be converted to coumarin by the methods previously described, without further treatment.

The alkaline solution of salicylalacetone that is first obtained as described above can be reacted with hypochlorite salt directly without going through the intermediate steps of precipitating with acid and redissolving in caustic alkali solution. In such a case, it is first necessary to remove the excess of acetone present therein, or, alternatively, to add such an excess of hypochlorite salt solution as is required to interact with the excess of acetone.

The acetone is readily removed by distillation, and preferably this is accomplished under slight vacuum while heating to 45° C., as above stated, acetone boiling normally at 56.5° C. If hypohalite salt is used to react with excess acetone, it forms chloroform, sodium acetate and caustic soda. The chloroform should be removed as it forms.

The reaction may be carried out in any alkaline medium and the use of caustic alkali, although preferred, is not a limitation. Salicylalacetone is insoluble in water, slightly soluble in mild alkalis, such as ammonia water and solutions of sodium carbonate. It forms very soluble sodium salts in stronger alkalis. Suspensions of it in mild alkali may be used, but complete solution makes the caustic alkalis preferred. The initial pH may be from pH of 7 upwards, it being noted that caustic soda formed tends to increase the alkalinity toward the preferred alkalinity. Mild alkali used to initiate the reaction thus increases the alkalinity.

In these specifications and claims, the term "alkali-earth metal-hypohalite" is intended to include bleaching powder which is a mixture of calcium hypochlorite, calcium chloride, and calcium oxide.

Having described my invention what I claim and desire to protect by Letters Patent is:

1. A process for preparing ortho-hydroxycinnamic acid which comprises reacting salicylalacetone with a member of the group consisting of the alkali metal- and alkali-earth metal-hypohalites, and acidifying the resultant salt of o-hydroxycinnamic acid.

2. A process for preparing ortho-hydroxycinnamic acid which comprises reacting an alkaline solution of salicylalacetone with a member of the group consisting of the alkali metal- and alkali earth-metal hypohalites, and acidifying the resultant salt of o-hydroxycinnamic acid.

3. A process for preparing ortho-hydroxycinnamic acid which comprises reacting an alkaline solution of salicylalacetone with sodium hypochlorite, and acidifying the resultant sodium o-hydroxycinnamate.

4. A process for preparing ortho-hydroxycinnamic acid which comprises reacting salicylaldehyde with acetone in alkaline solution, then interacting the resultant alkaline solution of salicylalacetone with sodium hypochlorite, and acidifying the sodium o-hydroxycinnamate thus obtained.

5. A process for preparing ortho-hydroxycinnamic acid which comprises reacting an alkaline solution of salicylalacetone with bleaching powder, and acidifying the resultant salt of o-hydroxycinnamic acid.

6. In a process for the manufacture of coumarin, the step which comprises reacting an alkaline solution of salicylalacetone with a member of the group consisting of the alkali metal- and alkali-earth metal-hypohalites.

7. In a process for the manufacture of coumarin, the step which comprises reacting an alkaline solution of salicylalacetone with sodium hypochlorite.

8. The process which comprises subjecting salicylalacetone to reaction with a member from the group consisting of alkali-metal- and alkali-earth-metal-hypohalites in an alkaline medium to form a salt of o-hydroxycinnamic acid.

9. The process which comprises subjecting salicylalacetone to reaction with a member from the group consisting of alkali-metal- and alkali-earth-metal-hypohalites in an alkaline medium to form a salt of o-hydroxycinnamic acid, and during the reaction removing chloroform from the reacting mass.

10. The process which comprises subjecting salicylalacetone to reaction with a member from the group consisting of alkali-metal- and alkali-earth-metal-hypohalites in an alkaline medium to form a salt of o-hydroxycinnamic acid, and during the reaction distilling chloroform from the reacting mass.

11. The process which comprises subjecting salicylalacetone to reaction with not more than a reacting equivalent of a member from the group consisting of alkali-metal- and alkali-earth-metal-hypohalite in an alkaline medium to form a salt of o-hydroxycinnamic acid.

12. The process which comprises subjecting salicylalacetone to reaction with not more than a reacting equivalent of a member from the group consisting of alkali-metal- and alkali-earth-metal-hypohalite in an alkaline medium to form a salt of o-hydroxycinnamic acid, and during the reaction removing chloroform from the reacting mass.

13. The process which comprises subjecting salicylalacetone to reaction with not more than a reacting equivalent of a member from the group consisting of alkali-metal- and alkali-earth-metal-hypohalite in an alkaline medium to form a salt of o-hydroxycinnamic acid, and during the reaction distilling chloroform from the reacting mass.

14. The process which comprises subjecting salicylalacetone to reaction with not more than a reacting equivalent of a member from the group consisting of alkali-metal- and alkali-earth-metal-hypohalite in an alkaline medium to form a salt of o-hydroxycinnamic acid, during the reaction removing chloroform from the reacting mass, and upon completion of the reaction and after removal of chloroform acidifying the mass to liberate free o-hydroxycinnamic acid.

15. The process which comprises subjecting salicylalacetone to reaction with not more than a reacting equivalent of a member from the group consisting of alkali-metal- and alkali-earth-metal-hypohalite in an alkaline medium to form a salt of o-hydroxycinnamic acid, during the reaction distilling chloroform from the reacting mass, and upon completion of the reaction and after removal of chloroform acidifying the mass to liberate free o-hydroxycinnamic acid.

JONAS KAMLET.